UNITED STATES PATENT OFFICE.

MARION JONATHAN HENDLEY, OF ATHENS, TEXAS.

METHOD OF MAKING CONCRETE TOMBSTONES.

No. 859,062.　　　Specification of Letters Patent.　　　Patented July 2, 1907.

Application filed February 15, 1906. Serial No. 301,318.

*To all whom it may concern:*

Be it known that I, MARION JONATHAN HENDLEY, a citizen of the United States, residing at Athens, in the county of Henderson and State of Texas, have invented a new and useful Method of Making Concrete Tombstones, of which the following is a specification.

This invention relates to a method of making concrete tomb-stones.

The object of the invention is in a ready and practical manner to obviate the necessity of wetting the concrete or wrapping it in wet cloths to prevent cracking when drying, materially to reduce the time necessary for the drying, and at the same time to eliminate the excessive care heretofore necessary in order to prevent cracking of the molded concrete; to enhance the beauty of the product; effectually to close the pores and cells of the concrete thereby to preclude entrance of water which, by freezing causes deterioration and breakage of the product, to cheapen its production and to obviate the necessity of the employment of any special type of machinery in its production.

With the above and other objects in view as will appear as the nature of the invention is better understood, the same consists in a method of making concrete tomb-stones, as will be hereinafter fully described and claimed.

The ingredients employed in the production of the concrete are sand, cement, salt and water together with a metallic coloring matter that is designed not only to impart beauty to the finished article but also to fill the pores and air cells and thus render the mass impermeable to water.

In carrying the invention into effect equal parts of sharp sand and cement are thoroughly co-mingled, and with it is mixed a salt water solution obtained by dissolving five pounds of salt in three gallons of water. The salt water solution is then mixed with the sand and cement in quantities to produce a mass having the consistency of thick dough and this is taken and packed into a mold of any desired shape and containing the designs that are to be borne by the tomb stone.

After the mass has remained in the mold for twenty-four hours there is applied to it a metallic paint consisting of powdered aluminium and gasolene in the proportion of one-half pound of the aluminium to one-half gallon of the gasolene. This paint is applied with a brush to the molded object at the rate of one coat a day for three days and owing to the damp condition of the mass it will take up the paint and cause its dissemination throughout quite a depth thereof. This paint imparts a beautiful luster to the article and at the same time operates to fill up air cells and pores, and render the surface impermeable to water, and at the same time impart to it a highly finished appearance.

By including salt with the sand and cement, the former, owing to the presence of magnesium chlorid, which is hygroscopic in character, will operate to retain the moisture and prevent its too rapid escape, thereby preventing cracking while drying and obviating the necessity of dampening the concrete or wrapping the same in wet cloths. Furthermore, it has been found that where the salt is used that the mold can be exposed to sun light to effect drying and that the drying can be completed in about four days, whereas heretofore it has required about thirty days to complete the drying, and the same must be done in the shade.

I claim:—

The method of making concrete articles which consists in mixing together sand, cement and salt and water, packing the resulting compound into a suitable mold and allowing the same to stand for twenty-four hours and subsequently coating the molded product with a metallic coloring substance to fill up the pores or cells and consisting of equal parts of powdered aluminium and gasolene, said coating being applied to the concrete at the rate of one coat a day for three successive days.

In testimony that I claim the foregoing as my own, I have hereto affixed my signature in the presence of two witnesses.

MARION JONATHAN HENDLEY.

Witnesses:
　T. H. BELL,
　J. R. GUNDT.